United States Patent [19]
Chen

[11] Patent Number: 5,988,239
[45] Date of Patent: Nov. 23, 1999

[54] WOOD PLANING MACHINE

[76] Inventor: Chin-Te Chen, No. 21, Lane 125, Yung-Ho St., Nan Dist., Taichung City, Taiwan

[21] Appl. No.: 09/213,410

[22] Filed: Dec. 17, 1998

[51] Int. Cl.$^6$ .................................. B27C 1/14; B27C 1/02
[52] U.S. Cl. ....................... 144/129; 144/117.1; 403/343
[58] Field of Search ............................ 144/114.1, 117.1, 144/129, 130; 403/345, 343

[56] References Cited

U.S. PATENT DOCUMENTS

| | | | |
|---|---|---|---|
| 3,718,168 | 2/1973 | Berends | 144/129 |
| 4,456,042 | 6/1984 | Clark et al. | 144/129 |
| 5,176,190 | 1/1993 | Miyamoto et al. | 144/117.1 |
| 5,725,035 | 3/1998 | Shadeck | 144/130 |
| 5,829,499 | 11/1998 | Liao | 144/129 |

*Primary Examiner*—W. Donald Bray
*Attorney, Agent, or Firm*—Finnegan, Henderson, Farabow, Garrett & Dunner, L.L.P.

[57] ABSTRACT

A wood planing machine includes left and right mounting frames fixed uprightly on left and right mounting sides of a bed body. Left and right pairs of lifting rods are upright disposed rotatably on the bed body, and have lower ends extending into the bed body and connected to each other by a transmission belt. A working table is disposed on the bed body, and has four lugs connected operably with the working table such that rotation of the lifting rods results in movement of the working table relative to the bed body. Feed-in and take-out shaftd are journalled between the left and right mounting frames above the working table. A tool mounting shaft is disposed between the feed-in and take-out shafts and is journalled between the mounting frames. A motor for driving the tool mounting shaft is disposed movably in the bed body so as to permit tension adjustment of a transmissin belt trailed over an output shaft of the motor and the tool mounting shaft.

9 Claims, 13 Drawing Sheets

WOOD PLANING MACHINE

BACKGROUND OF THE INVENTION

1. Field of the Invention

The invention relates to a planing machine, more particularly to a wood planing machine.

2. Description of the Related Art

Figure 1:
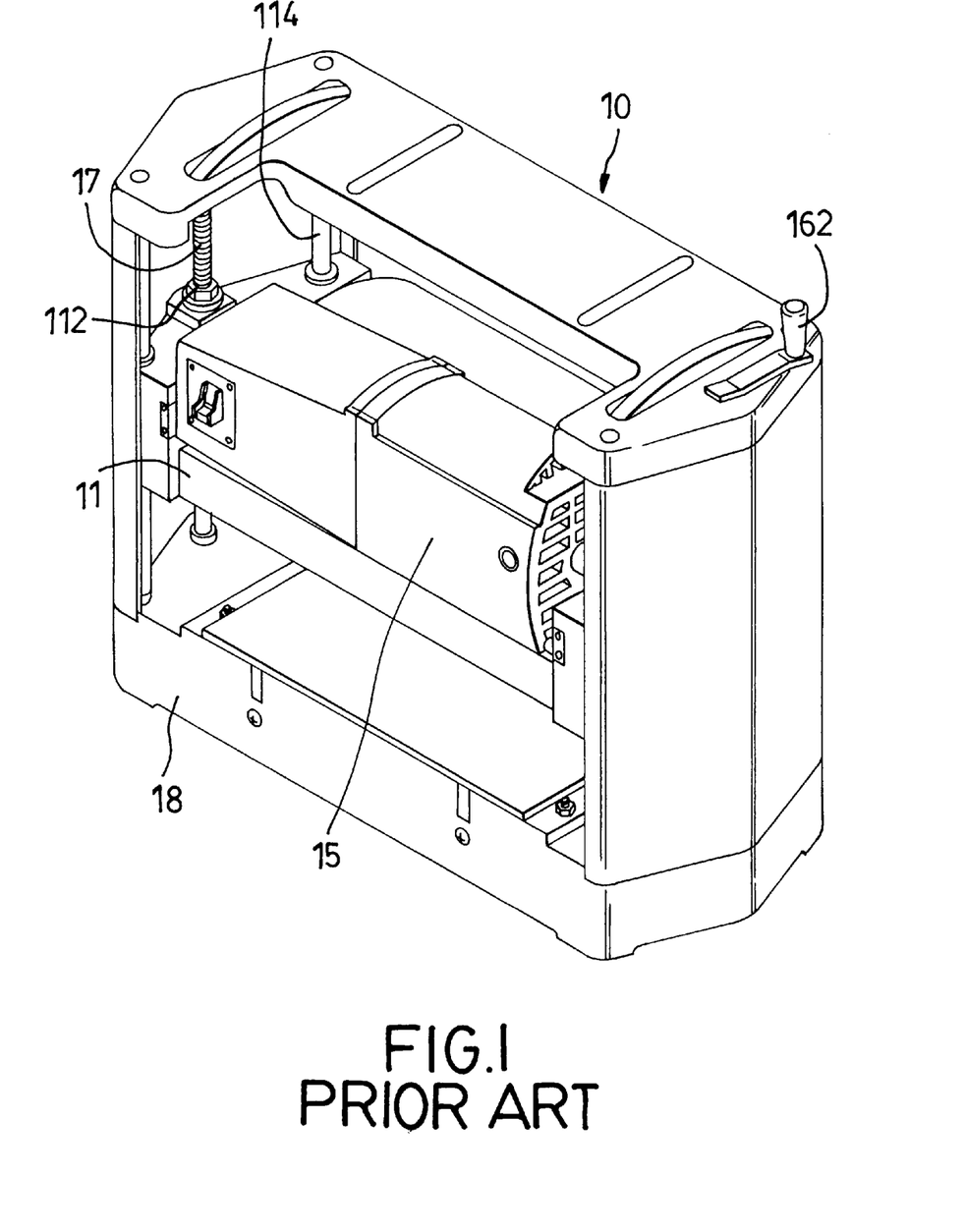
FIG. 1 is a perspective view of a conventional wood planing machine.
Figure 2:
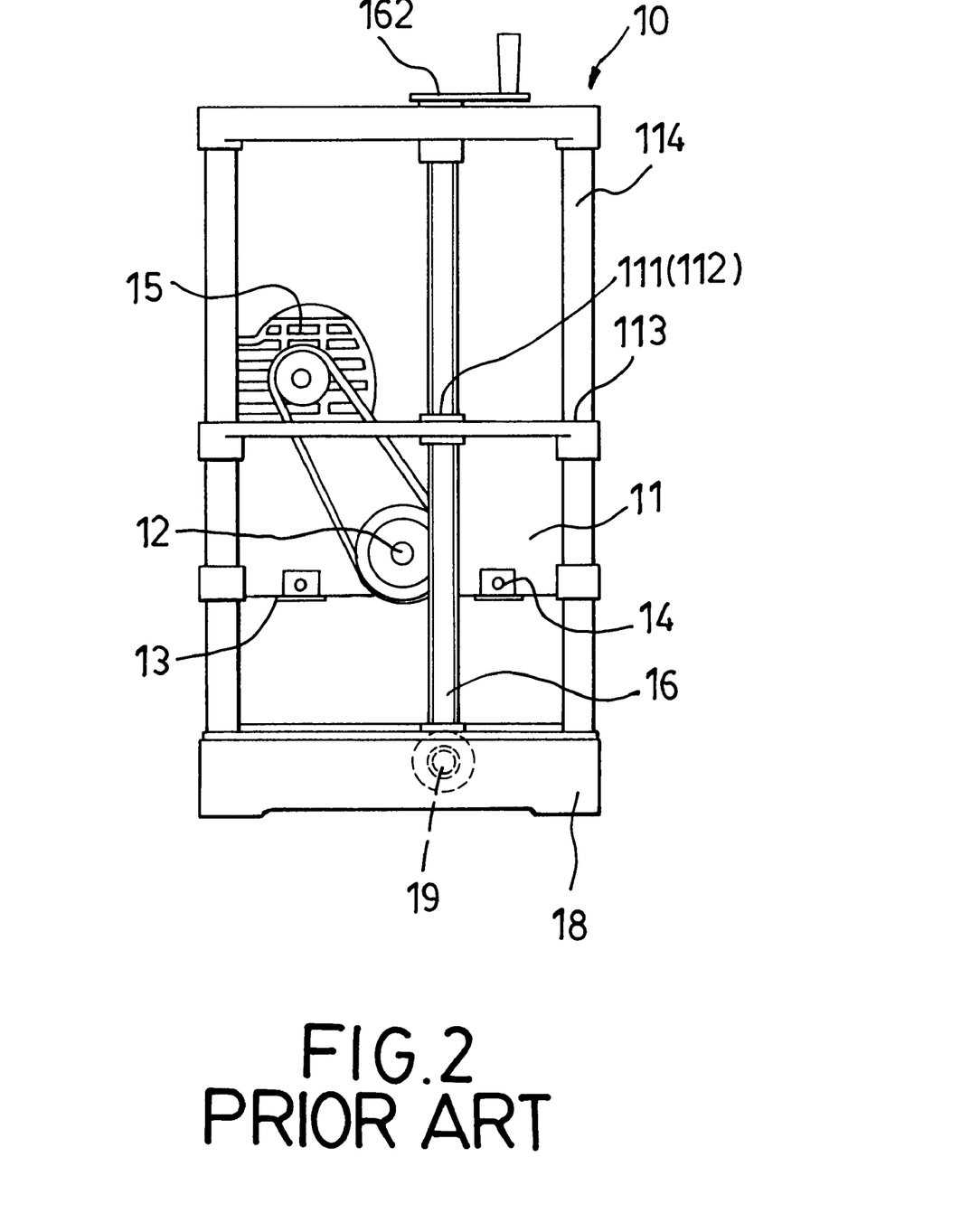
FIG. 2 is a side view of the conventional wood planing machine, wherein outer coverings are removed to illustrate the interior of the machine.
Figure 3:
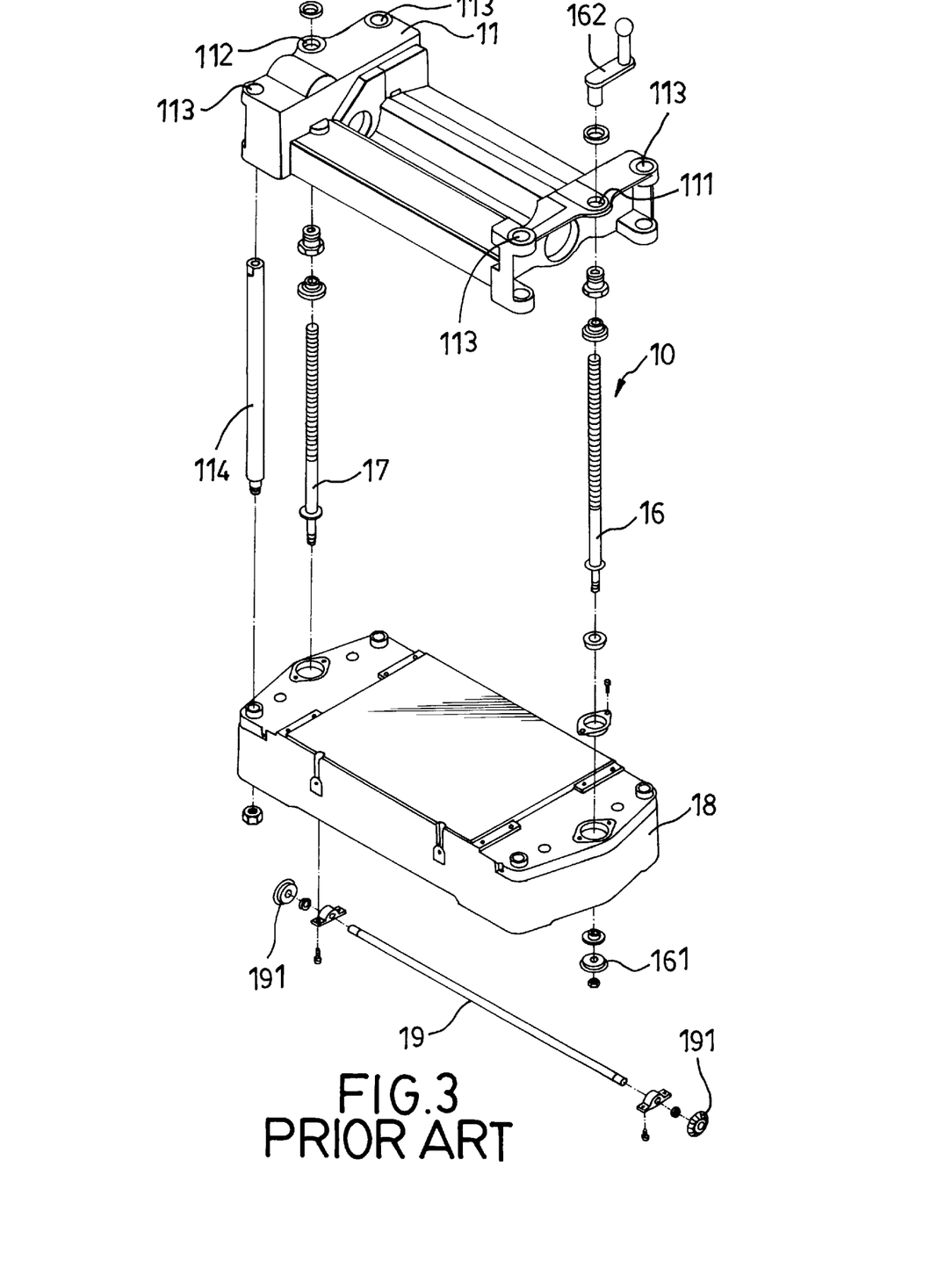
FIG. 3 is a partly exploded view of the conventional wood planing machine.

Referring to FIGS. 1, 2 and 3, a conventional wood planing machine 10 is shown to comprise a bed 18 over which a wooden work piece (not shown) passes, and an upper housing 11 above the bed 18. A cutting roller 12 is mounted on the upper housing 11 and is rotatable about a horizontal axis. Front and rear feed rollers 13, 14 are mounted on front and rear portions of the upper housing 11 and are rotatable about axes parallel to the cutting roller 12. A motor 15 is mounted on the upper housing 11 and is coupled to one end of the cutting roller 12 so as to drive rotatably the same. The other end of the cutting roller 12 is coupled to the feed rollers 13, 14 such that the feed rollers 13, 14 rotate synchronously with the cutting roller 12.

The upper housing 11 has opposite end portions provided with a pair of upright screw sockets 111, 112. The machine 10 further includes a pair of upright threaded rods 16, 17, each of which has a lower end portion mounted rotatably on the bed 18, and an upper end portion that extends threadedly and respectively through the sockets 111, 112. Each of the threaded rods 16, 17 further has a bevel gear 161 mounted on the lower end portion thereof. A horizontal coupling rod 19 is mounted rotatably in the bed 18, and has opposite end portions provided with a respective bevel gear 191 for meshing with the bevel gear 161 on the adjacent one of the threaded rods 16,17. An adjusting handle 162 is mounted on the upper end portion of the threaded rod 16 so that, upon operation of the handle 162, rotation of the threaded rod 16 is transmitted to the other threaded rod 17 via the coupling rod 19. The machine 10 further includes four pillars 114 that extend upwardly from the bed 18 and slidably through corresponding bores 113 formed in the opposite end portions of the upper housing 11. As such, the upper housing 11 can be raised or lowered relative to the bed 18 when the threaded rods 16, 17 rotate due to operation of the handle 162, thereby adjusting the height of the cutting roller 12 in accordance with the desired thickness of the finished product.

The drawbacks of the aforementioned wood planing machine 10 are as follows:

(I) When the planing machine 10 is in use, the upper housing 11 is constantly subjected to upward forces due to contact between the feed rollers 13, 14 and the work piece. This can lead to undesired movement of the upper housing 11 during cutting, and in uneven thickness at the front and rear parts of the work piece.

(II) Rotation of the threaded rods 16, 17 when raising or lowering the upper housing 11 results in a considerable amount of noise.

(III) The structure of the upper housing 11 is complicated, and results in a high manufacturing cost.

(IV) Because the upper housing 11 has to accommodate the motor 15 for driving the cutting roller 12, the housing 11 is bulky and occupies a large amount of space above the bed 18. This results in inconvenience when replacing the cutting roller 12.

SUMMARY OF THE INVENTION

Therefore, the object of this invention is to provide a wood planing machine which is clear of the aforesaid disadvantages that are generally associated with the conventional wood planing machine.

Accordingly, the wood planing machine of this invention includes a bed body having left and right mounting sides spaced apart from each other in a first transverse direction, and feed-in and feed-out sides spaced apart from each other in a longitudinal direction. Left and right mounting frames are disposed uprightly on the left and right mounting sides of the bed body. Left and right pairs of lifting rods are disposed uprightly on the left and right mounting sides of the bed body such that the lifting rods in each pair are disposed to be spaced apart from each other in the longitudinal direction, and have a pair of lower supported ends that are mounted rotatably on a respective one of the left and right mounting sides and a pair of upper supported ends that are mounted rotatably relative to a respective one of the left and right mounting frames. A working table is disposed on the bed body, and has four lugs disposed at positions corresponding to the left and right pairs of the lifting rods. Each of the lugs is sleeved on, and is movable to ascend or descend relative to the corresponding one of the lifting rods when the latter is rotated relative to both the respective one of the mounting sides and the respective one of the mounting frames. Feed-in and take-out shafts are respectively disposed at the feed-in and take-out sides of the bed body, and are journalled on the left and right mounting frames so as to be spaced apart from the working table in the second transverse direction. A tool mounting shaft is disposed between the feed-in and take-out shafts, and is journalled on the left and right mounting frames so as to be spaced apart from the working table in the second transverse direction. A cutting tool is disposed on the tool mounting shaft. A motor is disposed under the bed body, and has an output shaft with a first coupling end. A transmission belt is trailed over the first coupling end of the output shaft and one end of the tool mounting shaft to transmit rotation of the output shaft to the tool mounting shaft. A speed reduction gear and transmission belt assembly is disposed to couple the first coupling end of the output shaft with the feed-in and take-out shafts so as to synchronously rotate the feed-in and take-out shafts at a reduced speed. The feed-in and take-out shafts are biased toward the working table in the second transverse direction when the feed-in and take-out shafts are synchronously rotated relative to the mounting frames.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENTS

Figure 4:
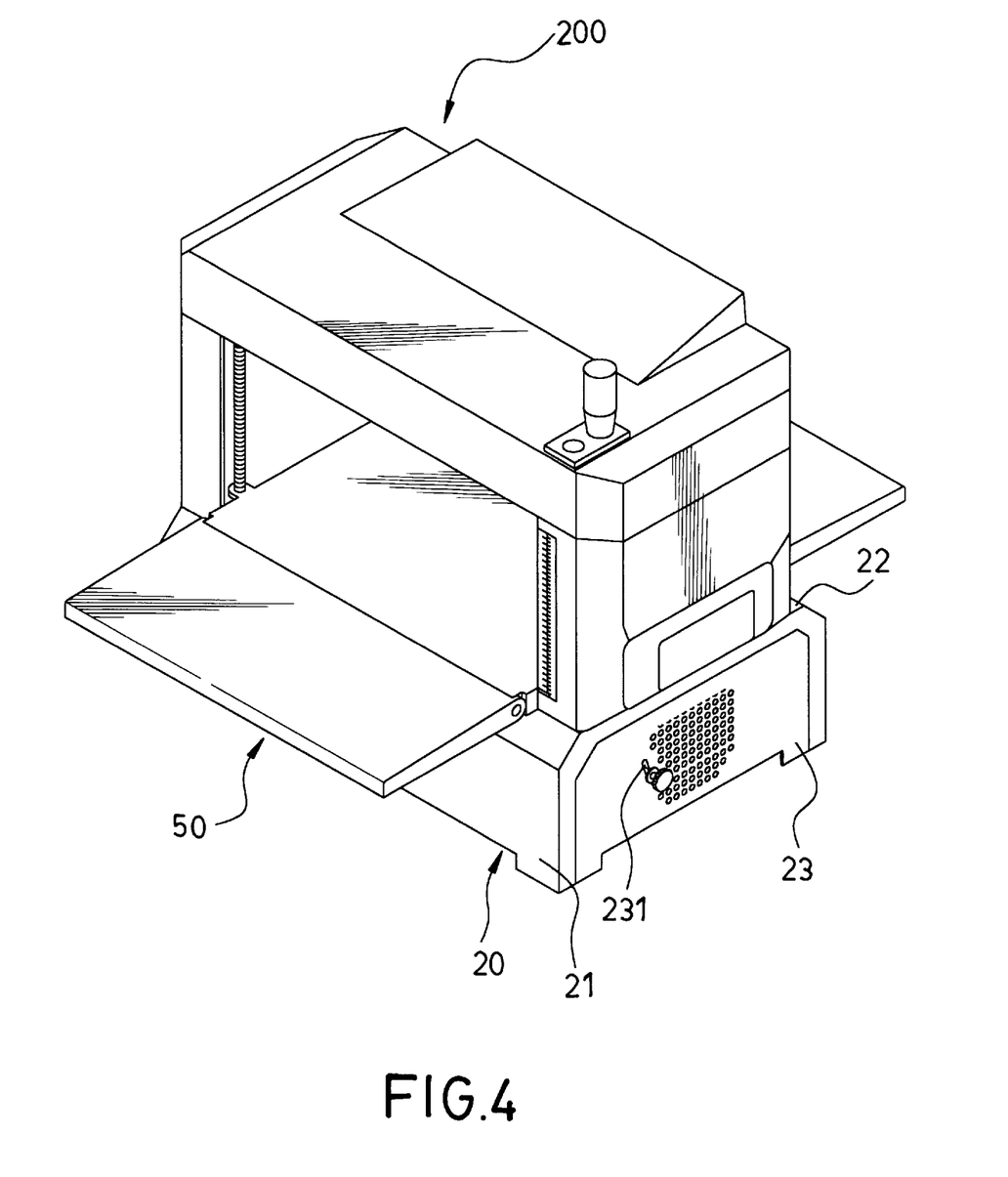
FIG. 4 is a perspective view of a preferred embodiment of a wood planing machine of this invention.
Figure 5:
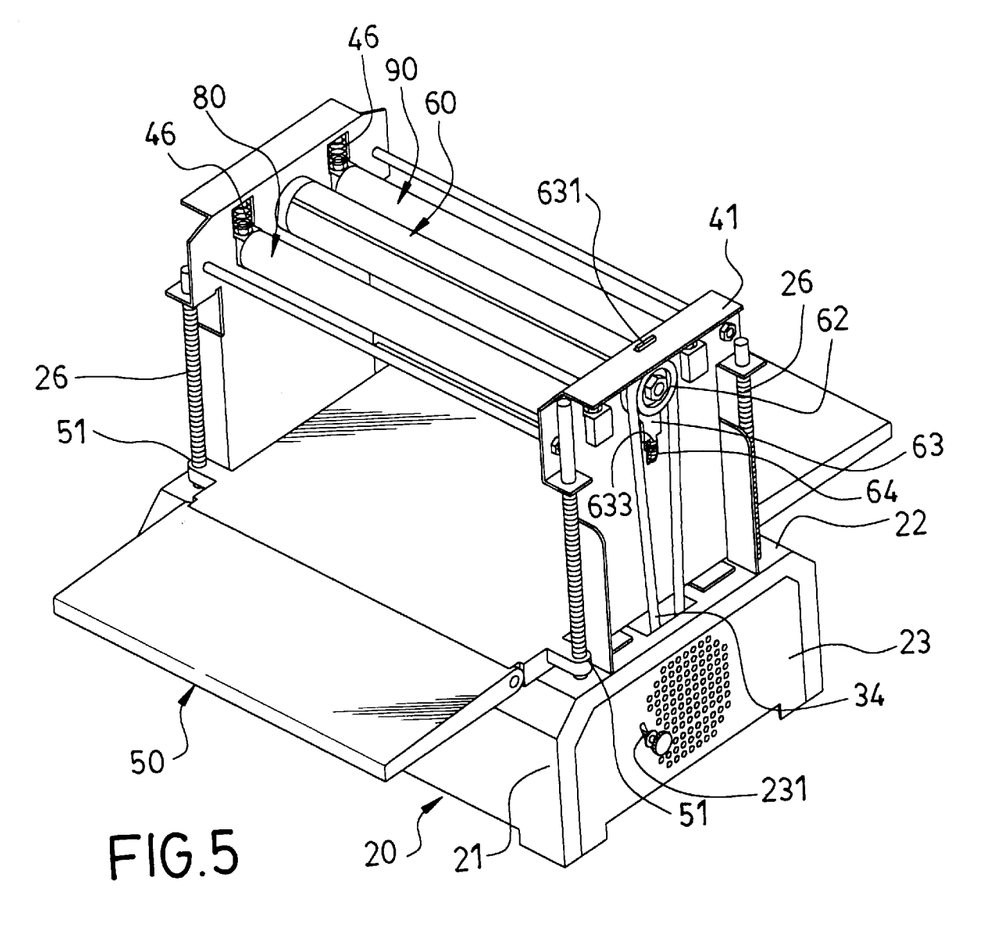
FIG. 5 illustrates how a tool mounting shaft and feed-in and take-out shafts are mounted in the preferred embodiment.
Figure 6:
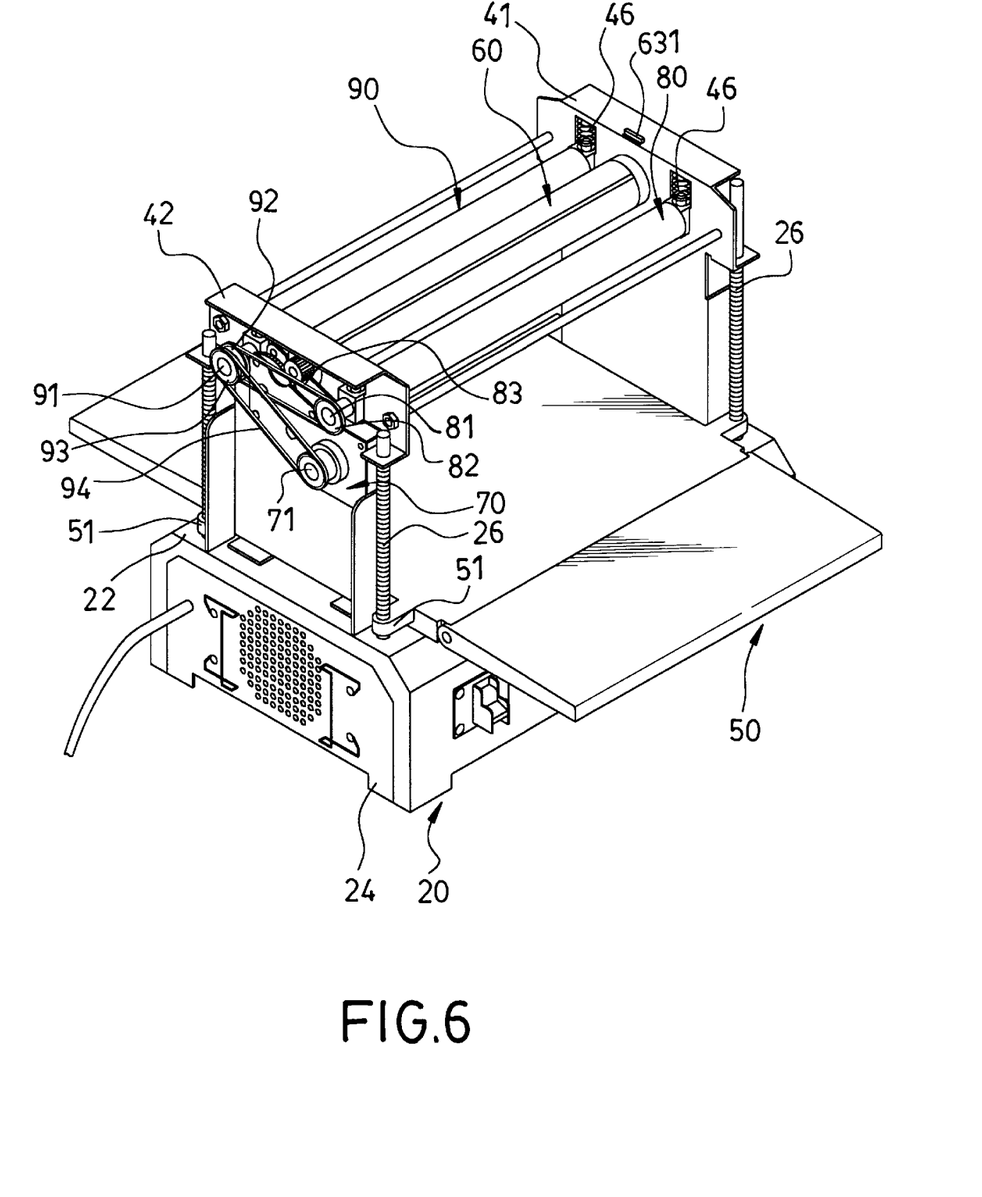
FIG. 6 illustrates how the tool mounting shaft and the feed-in and take-out shafts are interconnected to one another via a speed reduction gear and transmission belt assembly.

Referring to FIGS. 4, 5 and 6, the preferred embodiment of a wood planing machine of this invention is shown to include a bed body 20, left and right mounting frames 42, 41, left and right pairs of lifting rods 26, a working table 50, feed-in and take-out shafts 80, 90, a tool mounting shaft 62, a cutting tool 60, a motor 30 (see FIG. 7), a first transmission belt 34, a speed reduction gear and transmission belt assembly, and a biasing member.

As illustrated, the bed body 20 has left and right mounting sides 24, 23 spaced apart from each other in a first transverse direction, and feed-in and take-out sides 21, 22 disposed to be spaced apart from each other in a longitudinal direction.

The left and right mounting frames 42, 41 extend uprightly from the left and right mounting sides 24, 23 of the bed body 20, respectively, in a second transverse direction which is transverse to the first transverse and longitudinal directions.

The left and right pairs of lifting rods 26 are disposed uprightly on the left and right mounting sides 24, 23 of the bed body 20 in such a manner that the lifting rods 26 in each pair are spaced apart from each other in the longitudinal direction. Each pair of the lifting rods 26 has a pair of lower supported ends mounted rotatably on a respective one of the left and right mounting sides 24, 23, and a pair of upper supported ends mounted rotatably relative to a respective one of the left and right mounting frames 42, 41.

The working table 50 is disposed on the bed body 20 and defines a planing path in the longitudinal direction. The working table 50 has four lugs 51 disposed at positions corresponding to the left and right pairs of lifting rods 26. Each of the lugs 51 is sleeved on and is movable to ascend or descend relative to a corresponding one of the lifting rod 26 when the latter is rotated relative to the mounting sides 24, 23 and the mounting frames 42, 41.

The feed-in and take-out shafts 80, 90 are respectively disposed above the feed-in and take-out sides 21, 22, and have first and second left and right ends journalled on the left and right mounting frames 42, 41 respectively. The shafts 80, 90 are oriented in the first transverse direction so as to be spaced apart from the working table 50 in the second transverse direction.

The tool mounting shaft 62 is disposed between the feed-in and take-out sides 21, 22 in the longitudinal direction, and has third left and right ends respectively journalled on the left and right mounting frames 42, 41 so as to be oriented in the first transverse direction.

The cutting tool 60 disposed on the tool mounting shaft 62.

The motor 30 is disposed under the bed body 20, and has an output shaft 31 with a first coupling end 32.

The first transmission belt 34 is trailed over the first coupling end 32 of the output shaft 31 and one of the third right and left ends of the tool mounting shaft 62 to transmit rotation of the output shaft 31 to the tool mounting shaft 62.

The speed reduction gear and transmission belt assembly is disposed to couple the first coupling end 32 with one of the first and second left and right ends of the feed-in and take-out shafts 80, 90 so as to synchronously rotate the feed-in and take-out shafts 80, 90 at a reduced speed.

The biasing member biases the feed-in and takeout shafts 80, 90 toward the working table 50 in the second transverse direction when the feed-in and take-out shafts 80, 90 are synchronously rotated relative to the mounting frames 42, 41.

Figure 10:
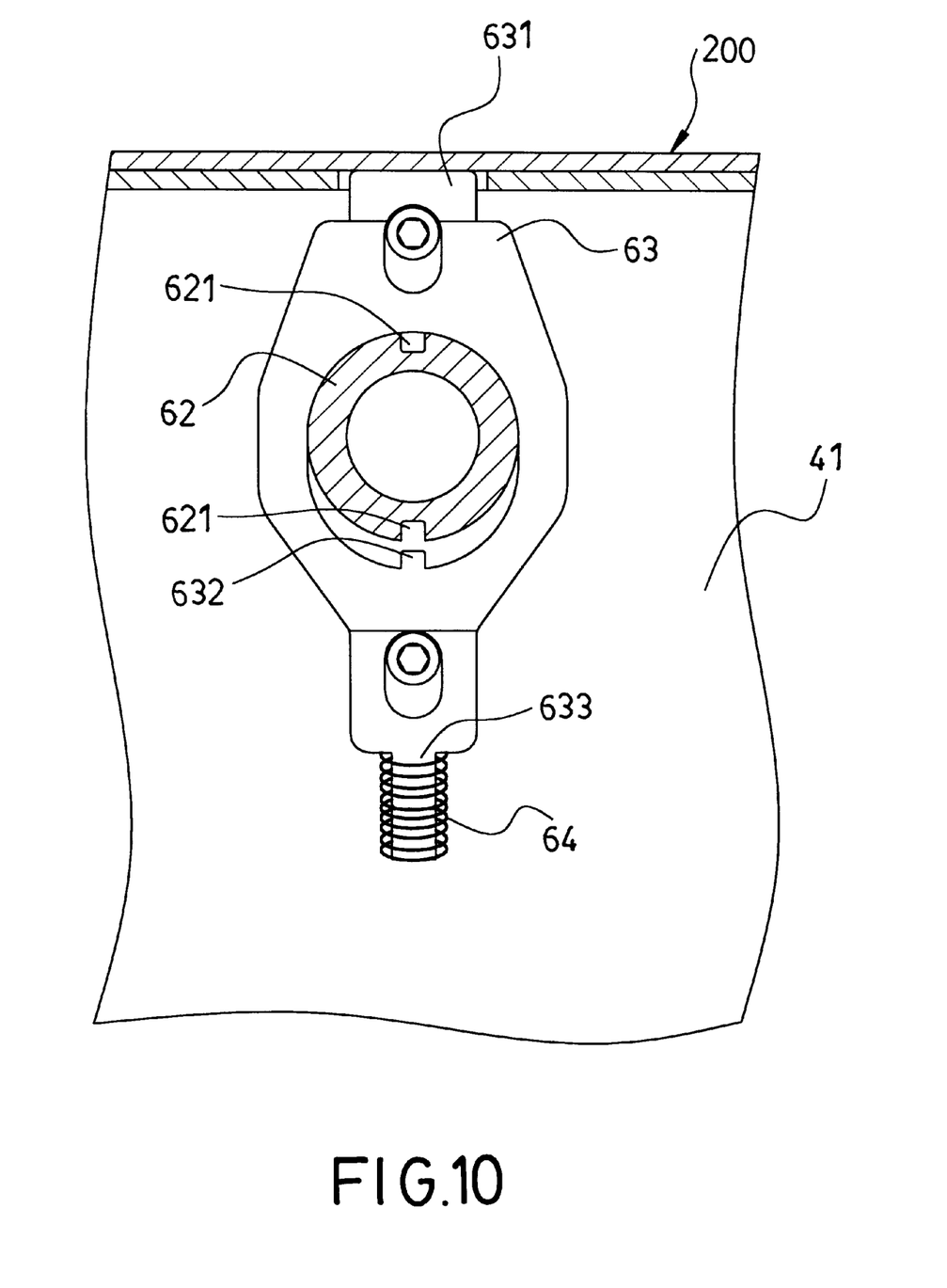
FIG. 10 is a partly sectional view of the preferred embodiment, illustrating a locking unit for releasably locking the tool mounting shaft.
Figure 11:
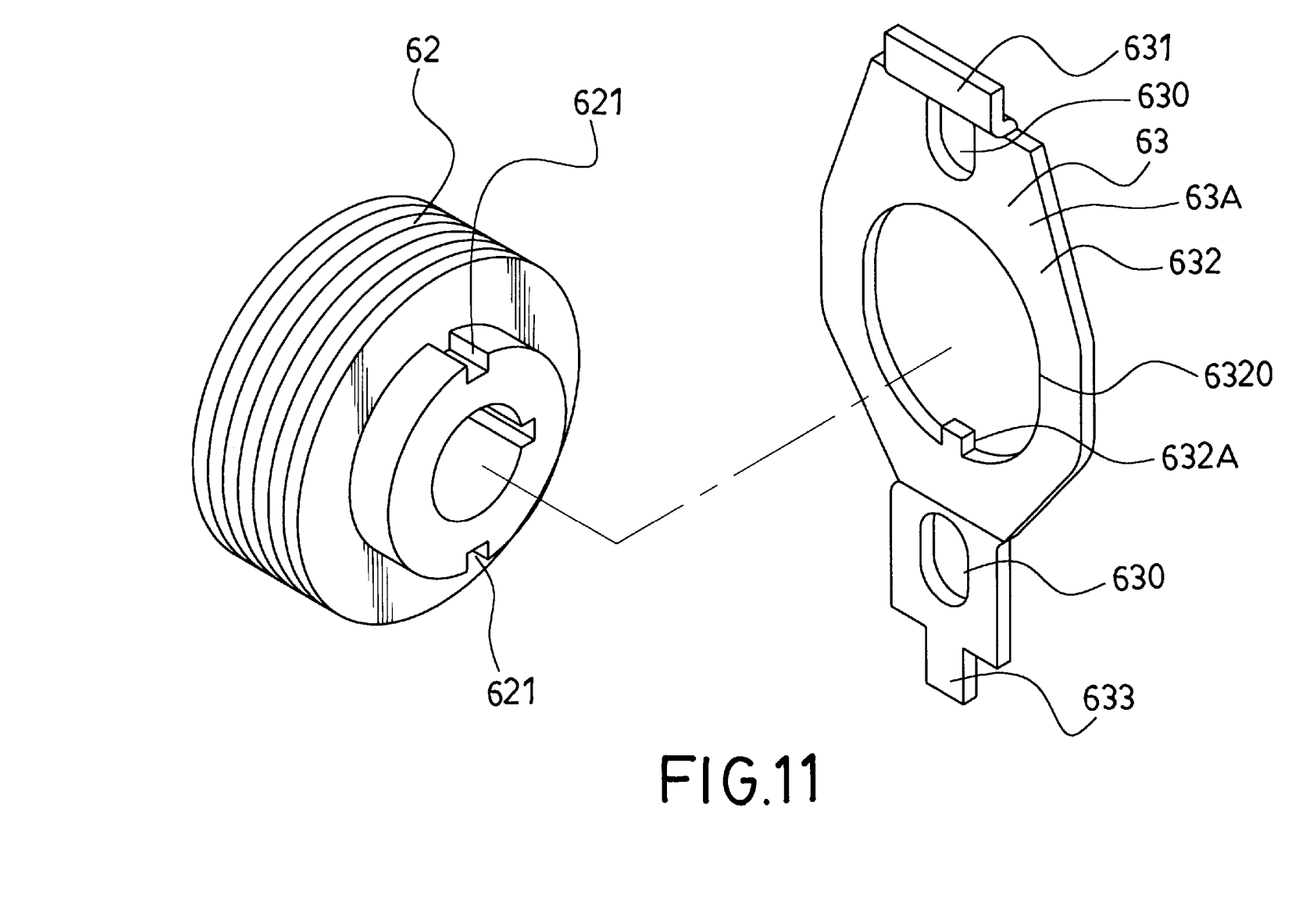
FIG. 11 is an enlarged view of a locking plate employed in the locking unit of FIG. 10.
Figure 12:
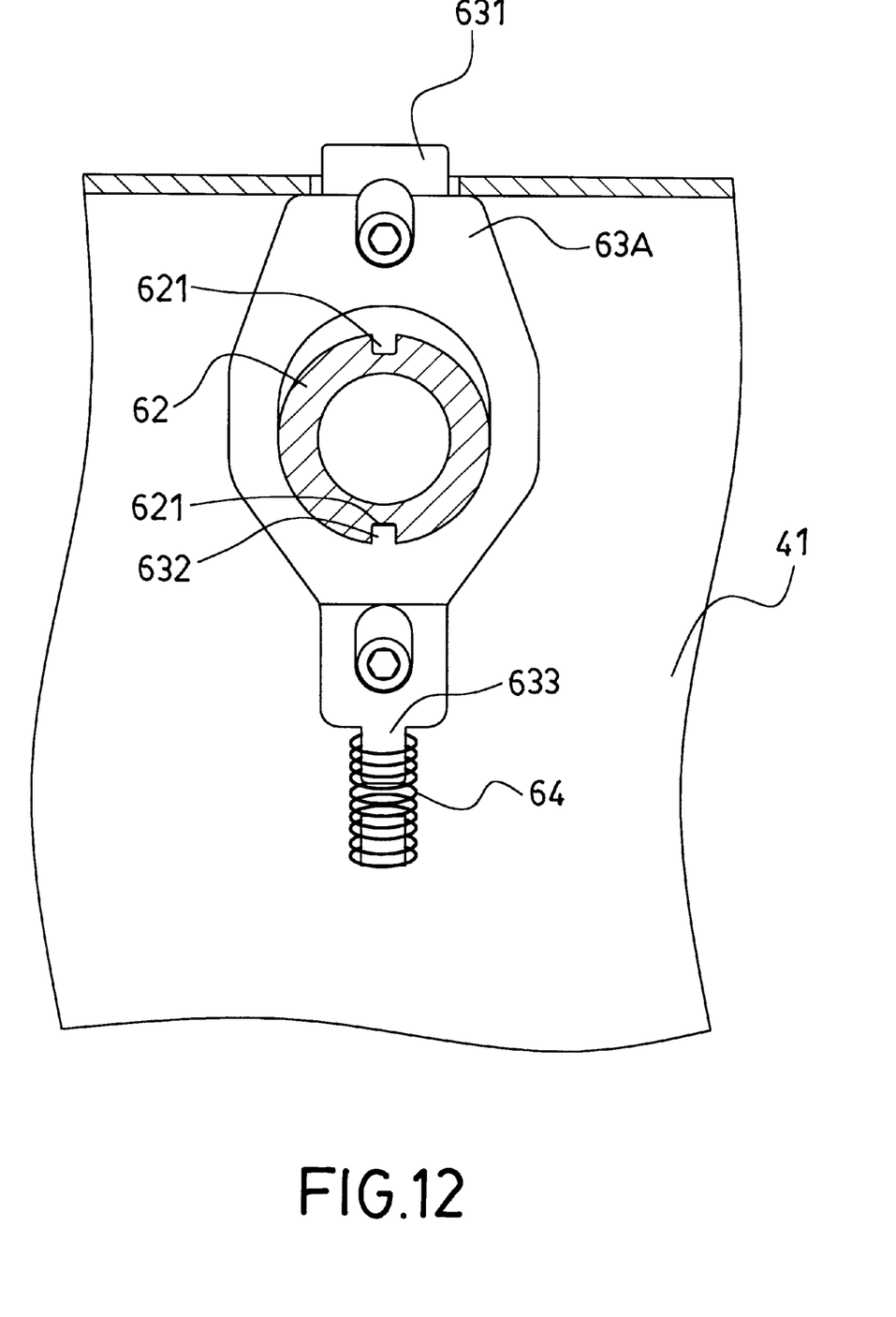
FIG. 12 is a partly sectional view of the preferred embodiment, illustrating how the tool mounting shaft is locked from rotation.

Referring to FIGS. 10, 11 and 12, the wood planing machine further includes a locking unit 63 disposed to be movable between upper and lower positions, a second biasing member 64 for biasing the locking unit 63 in the second transverse direction so as to push the locking unit 63 toward the upper position, and a stopper for stopping the locking unit 63 at the lower position. At the upper position, the locking unit 63 engages the tool mounting shaft 62 so as to prevent the same from rotation. At the lower position, the locking unit 63 is disengaged from the tool mounting shaft 62, thereby permitting rotation of the tool mounting shaft 62 relative to the left and right mounting frames 42, 41. As best shown in FIG. 11, the right end of the tool mounting shaft 62 is formed with radial engagement grooves 621. The locking unit 63 includes a flat locking plate 63A with two aligned slots 630 via which two locking bolts extend so as to mount the same on the right mounting frame 41 such that the locking plate 63A is movable between the upper and lower positions. The locking plate 63A has a lower portion 633 biased by the second biasing member 64, an upper portion 631 projecting beyond an uppermost end of the right mounting frame 41 (see FIG. 12) when the locking plate 63A is at the upper position, and an intermediate portion 632 that is interposed between the upper and lower portions 631, 633 and that has a circular through hole 6320 to permit extension of the tool mounting shaft 62 therethrough, and an engaging key 632A projecting inwardly and radially into the through hole 6320 from the periphery that confines the through hole 6320. The engaging key 632A is engageable in one of the engagement grooves 621 of the tool mounting shaft 62 once the latter is rotated relative to the right mounting frame 41 so as to register the engagement grooves 621 with the engaging key 632A when the locking plate 63A is at the upper position (see FIG. 12). In this embodiment, the stopper includes a stopping plate 200, in the form of a top cover, secured detachably on the uppermost end of the right mounting frame 41 to depress the upper portion 631 of the locking plate 63A to be flush with the uppermost end of the right mounting frames 42, 41 (see FIG. 10). Thus, the locking plate 63A can be retained at the lower position.

Figure 7:
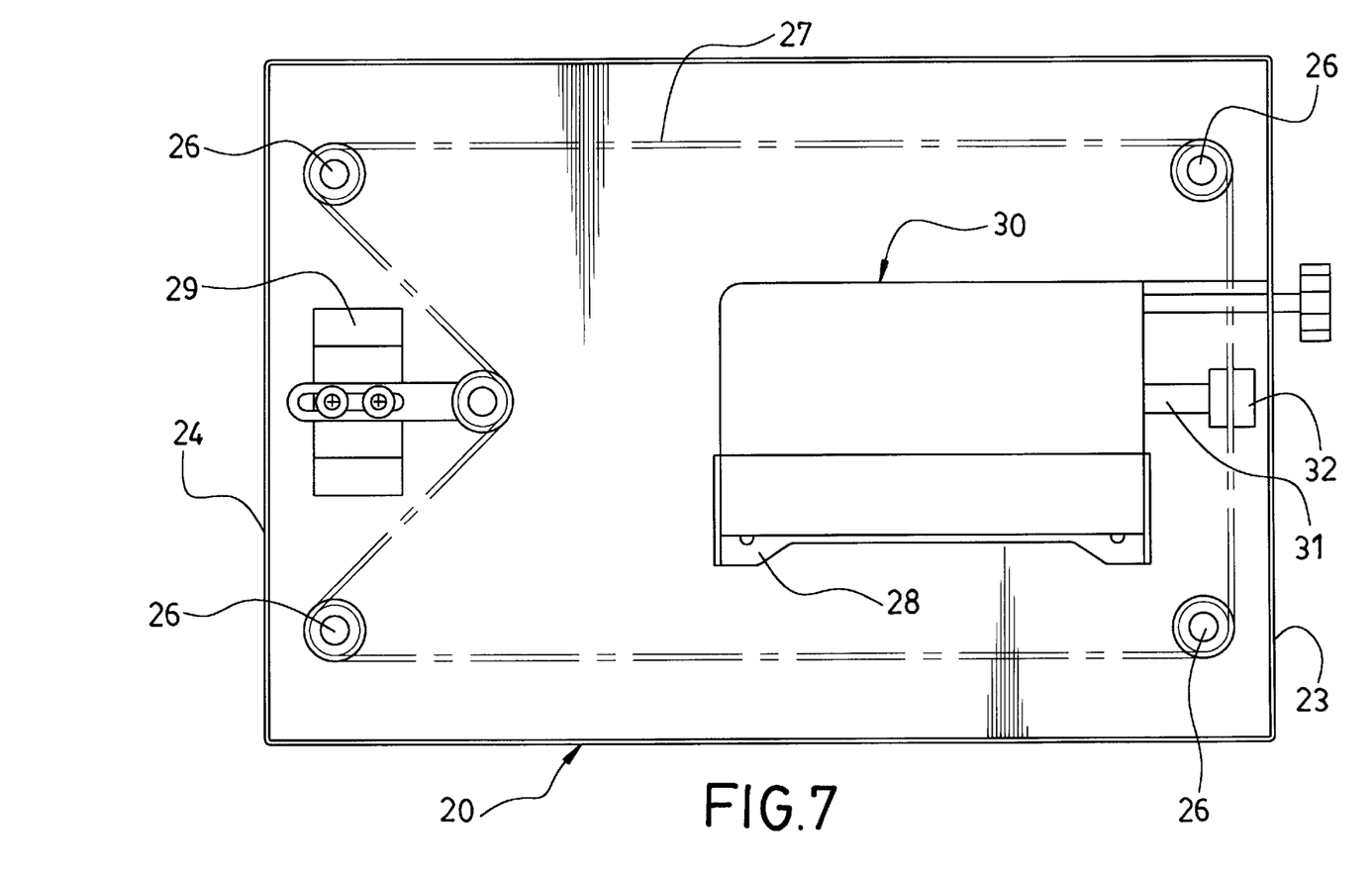
FIG. 7 illustrates how left and right pairs of lifting rods are connected to each other for raising and lowering a working table of the preferred embodiment.

Referring to FIG. 7, the wood planing machine further includes a second transmission belt 27 disposed in the bed body 20 and is trailed over the lower supported ends of the left and right pairs of lifting rods 26 so that rotation of one of the lifting rods 26 will be transmitted to remaining ones of the lifting rods 26 in order to raise or lower the working table 50. A belt adjustment mechanism 29 is also disposed in the bed body 20 and is connected operably to the second transmission belt 27 for tension adjustment thereof.

Figure 8:
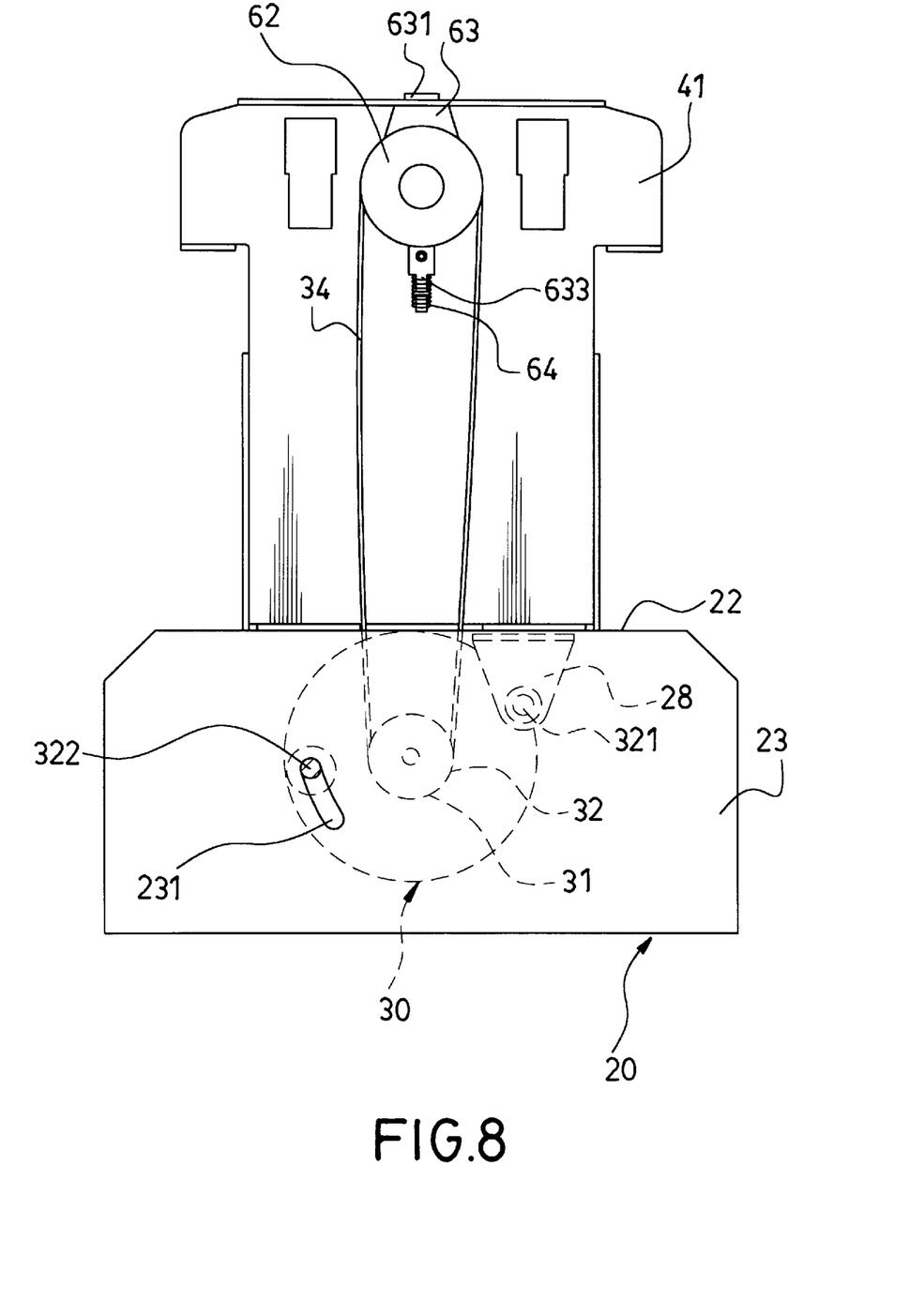
FIG. 8 is a right side view of the preferred embodiment, illustrating a state prior to adjusting a transmission belt trailed over the tool mounting shaft and an output shaft of a motor.
Figure 9:
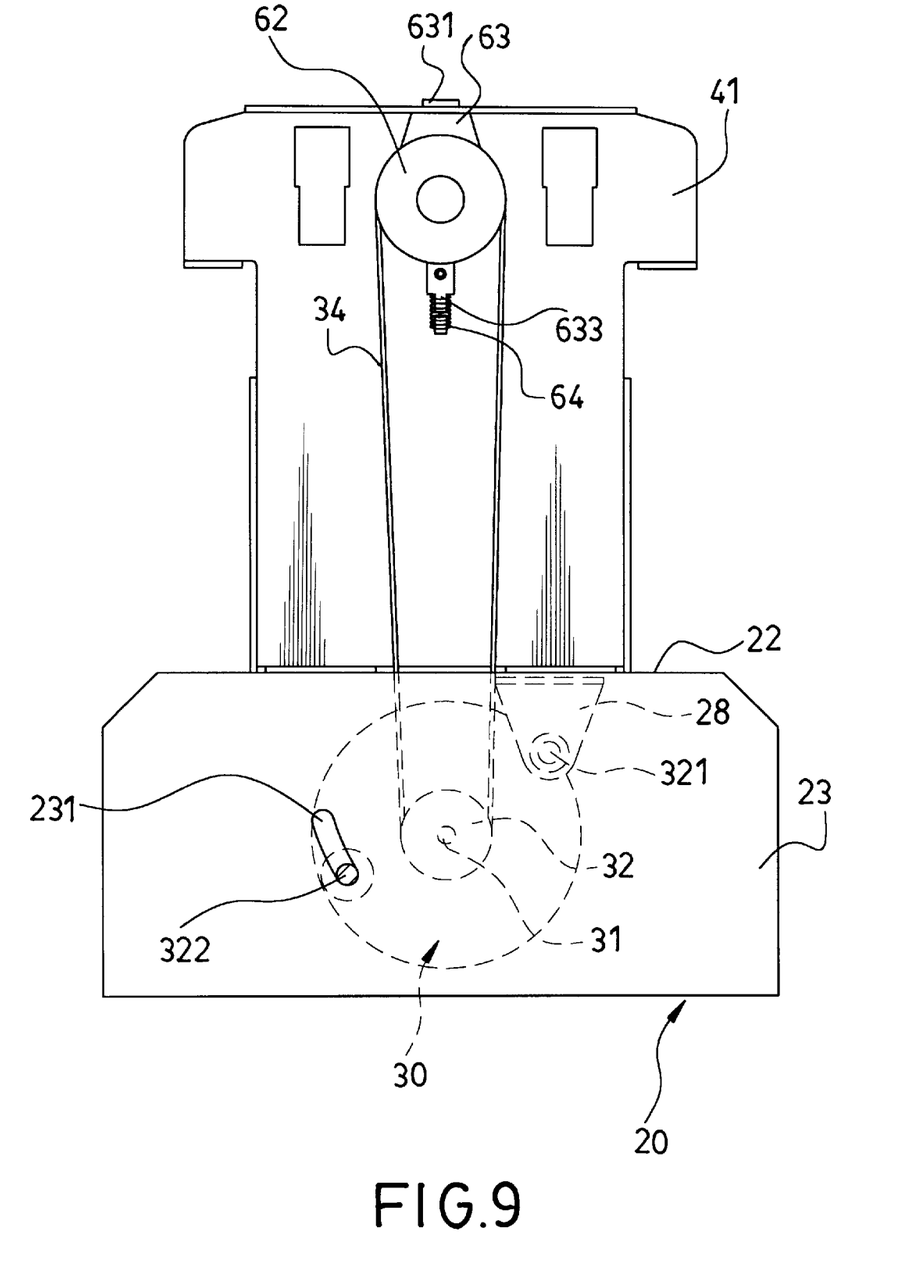
FIG. 9 is a right side view of the preferred embodiment, illustrating a state after adjustment of the transmission belt.

Referring to FIGS. 7, 8 and 9, the motor 30 employed in the preferred embodiment includes a motor casing having a pair of mounting rods 321, 322 disposed diametrically relative to the output shaft 31 and extending in the first transverse direction. A first one of the mounting rods 321 is pivoted to a bracket member 28 of the bed body 20. A second one of the mounting rods 322 extends outwardly of a curved slot 231 formed in the right mounting side 23 of the bed body 20 and is detachably secured thereto such that relative movement between the mounting rods 321, 322 will alter a distance between the output shaft 31 and the tool mounting shaft 62 and consequently result in tension adjustment of the first transmission belt 34.

Referring again to FIGS. 5 and 6, the left and right mounting frames 42, 41 further have two pairs of bearing retention slots 46 formed therethrough in the second transverse direction proximate to the uppermost ends thereof, and two pairs of bearing members disposed to be journalled by the left and rights ends of the feed-in and take-out shafts 80, 90 and disposed movably in the bearing retention slots 46 such that the shafts 80, 90 are movable limitedly in the second transverse direction. The biasing member includes a plurality of coil springs disposed in the bearing retention slots 46 to bias the bearing members in the second transverse direction toward the working table 50.

In addition, the first and second left ends 81, 91 of the feed-in and take-out shafts 80, 90 project outwardly of the left mounting frame 42. The speed reduction gear and transmission belt assembly includes a reduction gear system 70 having a driven end (not visible) coupled to the output shaft 31, and a drive end 71 mounted rotatably on the left mounting frame 41 at an elevation below the feed-in shaft 80, first and second pulleys 92, 93 fixed coaxially on the second left end 91 of the take-out shaft 90, and third and fourth transmission belts 94, 83 trailed over the drive end 71 and the first pulley 92, and the second pulley 93 and the first left end 81 of the feed-in shaft 80 such that the feed-in and take-out shafts 80, 90 synchronously rotate at the reduced speed. Each of the upper supported ends of the lifting rods 26 is formed with an external thread while each of the lugs 51 is formed with an internally threaded socket to mesh with the external thread such that rotation of the lifting rods 26 results in ascent or descent of the working table 50 relative to the tool mounting shaft 62.

Figure 13:
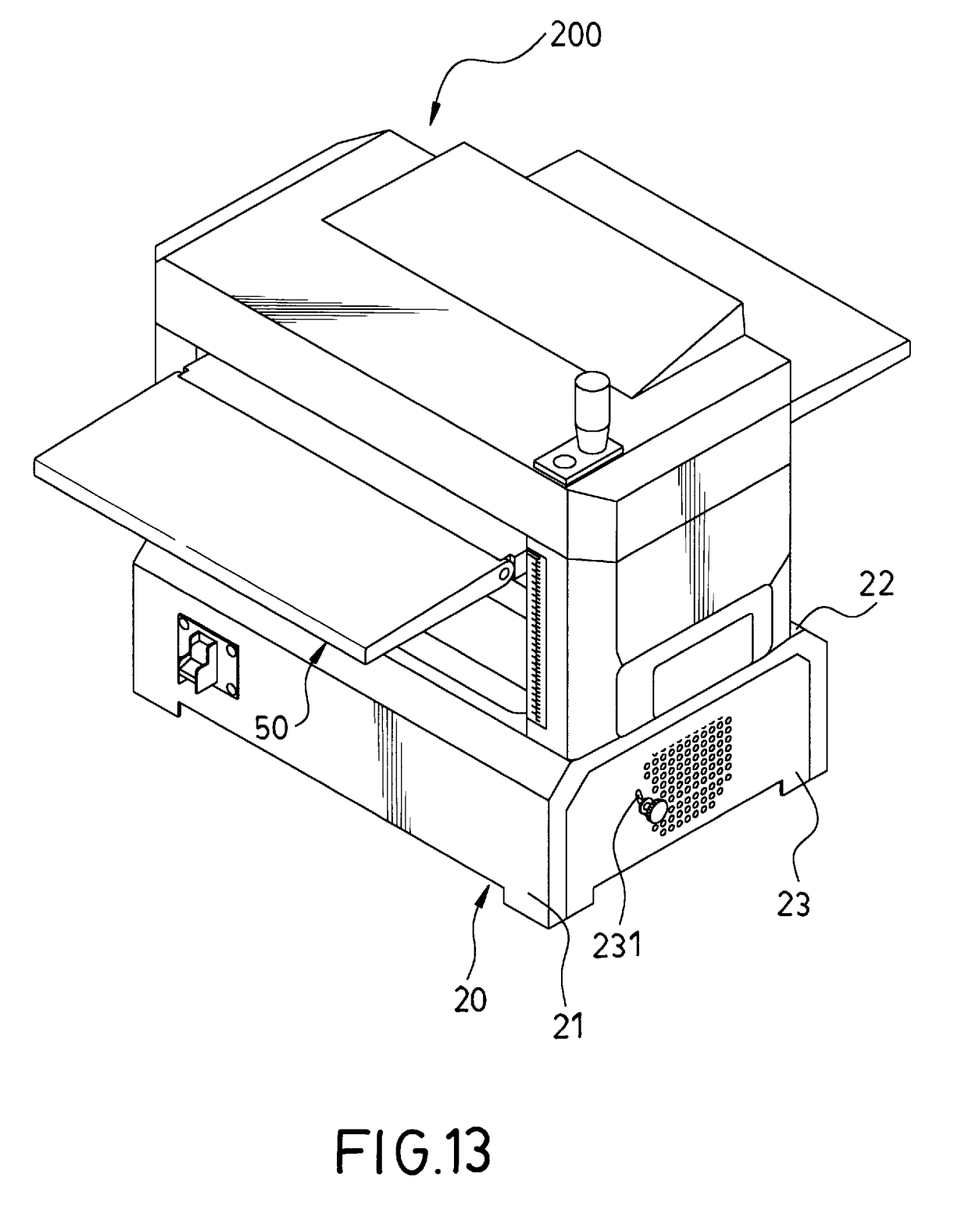
FIG. 13 is a perspective view of the preferred embodiment, wherein a working table is lifted upward so as to be closer to the tool mounting shaft.

FIG. 13 illustrates how the working table 50 is lifted toward the tool mounting shaft 62 due to rotation of the lifting rods 26.

The advantages of the wood planing machine of this invention are as follows:

(I) The left and right mounting frames 42, 41 can be formed by pressing, thereby avoiding the complicated process of forming the upper housing 11 in the prior art wood planing machine described beforehand.

(II) The tension of the first transmission belt 34 can be externally adjusted.

(III) Because the motor 30 for driving the tool mounting shaft 62 is disposed in the bed body 20, a larger mount of space is provided between the tool mounting shaft 62 and the bed body 20. This facilitate replacement of the cutting tool 60 on the tool mounting shaft 62.

(IV) Since removal the top cover 200 will permit engagement of the engaging key in the tool mounting shaft 62, injuring to the operator's hands during replacement of the cutting tool 60 can be avoided.

With this invention thus explained, it is apparent that numerous modifications and variations can be made without departing from the scope and spirit of this invention. It is therefore intended that this invention be limited only as indicated in the appended claims.

I claim:

1. A wood planing machine comprising:

a bed body having left and right mounting sides 23 spaced apart from each other in a first transverse direction, and feed-in and take-out sides disposed to be spaced apart from each other in a longitudinal direction;

left and right mounting frames disposed on and extending uprightly and respectively from said left and right mounting in a second transverse direction which is transverse to both said first transverse and longitudinal directions;

left and right pairs of lifting rods uprightly disposed on said left and right mounting sides respectively, each pair of said lifting rods being disposed to be spaced apart from each other in said longitudinal direction, and having a pair of lower supported ends mounted rotatably on a respective one of said left and right mounting sides, and a pair of upper supported ends mounted rotatably relative to a respective one of said left and right mounting frames;

a working table disposed on said bed body and defining a planing path in said longitudinal direction, said working table having four lugs disposed at positions corresponding to said left and right pairs of lifting rods, each of said lugs being sleeved on and being movable to ascend or descend relative to a corresponding one of said lifting rods when the corresponding one of said lifting rods is rotated relative to both the respective one of said mounting sides and the respective one of said mounting frames;

feed-in and take-out shafts respectively disposed above said feed-in and take-out sides, and having first and second left and right ends respectively journalled on said left and right mounting frames and oriented in said first transverse direction so as to be spaced apart from said working table in said second transverse direction;

a tool mounting shaft disposed between said feed-in and take-out shafts, and having third left and right ends respectively journalled on said left and right mounting frames and oriented in said first transverse direction;

a cutting tool disposed on said tool mounting shaft;

a motor disposed under said bed body, and having an output shaft with a first coupling end;

a first transmission belt trailed over said first coupling end and one of said third right and left ends to transmit rotation of said output shaft to said tool mounting shaft;

a speed reduction gear and transmission belt assembly disposed to couple said first coupling end with said first and second left and right ends so as to synchronously rotate said feed-in and take-out shafts at a reduced speed; and first biasing member for biasing said feed-in and take-out shafts toward said working table in said second transverse direction when said feed-in and take-out shafts are synchronously rotated relative to said mounting frames.

2. The wood planing machine as defined in claim 1, further comprising:

a locking unit disposed to be movable in said second transverse direction between an upper position, where said locking unit engages with said tool mounting shaft so as to prevent said tool mounting shaft from rotation, and a lower position, where said locking unit is disengaged from said tool mounting shaft, thereby permitting rotation of said tool mounting shaft relative to said left and right mounting frames;

second biasing member for biasing said locking unit in said second transverse direction so as to push said locking unit toward said upper position; and means for stopping said locking unit at said lower position against biasing action of said biasing member.

3. The wood planing machine as defined in claim 2, wherein said right end of said tool mounting shaft is formed with an engagement groove that extends radially thereof, said locking unit including a flat locking plate disposed to be movable between said upper and lower positions, and having a lower portion biased by said second biasing member, an upper portion projecting beyond an uppermost end of said right mounting frame when said locking plate is at said upper position, and an intermediate portion that is interposed between said upper and lower portions and that has a circular through hole to permit extension of said tool mounting shaft therethrough and an engaging key projecting inwardly and radially into said through hole from the periphery confining said through hole, said engaging key being engageable in said engagement groove of said tool mounting shaft once said tool mounting shaft is rotated relative to said right mounting frame so as to register said engagement groove with said engaging key when said locking plate is at said upper position.

4. The wood planing machine as defined in claim 3, wherein said stopping means includes a stopping plate capable of being brought to and secured detachably on said uppermost end of said right mounting frame to depress said upper portion of said locking plate to be flush with said uppermost end of said right mounting frame, thereby retaining said locking plate at said lower position.

5. The wood planing machine as defined in claim 1, further comprising:

a second transmission belt disposed in said bed body and trailed over said lower supported ends of said left and right pairs of lifting rods so that rotation of one of said lifting rods will be transmitted to remaining ones of said lifting rods in order to raise or lower said working table; and a belt adjustment mechanism disposed in said bed body and connected operably to said second transmission belt for tension adjustment thereof.

6. The wood planing machine as defined in claim 1, wherein said motor further includes a motor casing having a pair of mounting rods disposed diametrically relative to said output shaft and extending in said first transverse direction, a first one of said mounting rods being pivoted to said right mounting side of said bed body and a second one of said mounting rods being detachably secured to said right mounting side such that relative movement between said mounting rods will alter a distance between said output shaft and said tool mounting shaft and consequently result in tension adjustment of said first transmission belt.

7. The wood planing machine as defined in claim 3, wherein said left and right mounting frames further have two pairs of bearing retention slots in said second transverse direction and proximate to said uppermost ends thereof, and two pairs of bearing members disposed to be journalled by said left and rights ends of said feed-in and take-out shafts and disposed movably in said bearing retention slots, said first biasing means biasing said bearing members in said second transverse direction toward said working table.

8. The wood planing machine as defined in claim 7, wherein said first and second left ends of said feed-in and take-out shafts project outwardly of said left mounting frame, said speed reduction gear and transmission belt assembly including:

a reduction gear system having a driven end coupled to said output shaft, and a drive end mounted rotatably on said left mounting frame at an elevation below said feed-in shaft;

first and second pulleys fixed coaxially on said second left end of said take-out shaft; and third and fourth transmission belts trailed over said drive end and said first pulley, and said second pulley and said first left end of said feed-in shaft such that said feed-in and take-out shafts synchronously rotate at said reduced speed.

9. The wood planing machine as defined in claim 8, wherein each of said upper supported ends of said lifting rods is formed with an external thread, each of said lugs being formed with an internally threaded socket to mesh with said external thread such that rotation of said lifting rods results in ascent or descent of said working table relative to said tool mounting shaft.

* * * * *